US012425291B2

(12) United States Patent
Banipal et al.

(10) Patent No.: US 12,425,291 B2
(45) Date of Patent: Sep. 23, 2025

(54) ALERT MANAGEMENT

(71) Applicant: INTERNATIONAL BUSINESS MACHINES CORPORATION, Armonk, NY (US)

(72) Inventors: Indervir Singh Banipal, San Jose, CA (US); Shikhar Kwatra, San Jose, CA (US); Nadiya Kochura, Bolton, MA (US); Sourav Mazumder, Contra Costa, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 18/435,444

(22) Filed: Feb. 7, 2024

(65) Prior Publication Data
US 2025/0254083 A1 Aug. 7, 2025

(51) Int. Cl.
*H04L 41/0654* (2022.01)
*H04L 41/0631* (2022.01)
*H04L 41/16* (2022.01)

(52) U.S. Cl.
CPC ...... *H04L 41/0654* (2013.01); *H04L 41/0636* (2013.01); *H04L 41/16* (2013.01)

(58) Field of Classification Search
CPC .. H04L 41/0654; H04L 41/0636; H04L 41/16
See application file for complete search history.

(56) References Cited

U.S. PATENT DOCUMENTS

| | | | |
|---|---|---|---|
| 6,516,350 | B1 | 2/2003 | Lumelsky et al. |
| 10,348,810 | B1 | 7/2019 | Florissi et al. |
| 10,594,712 | B2 * | 3/2020 | Mestha ............ G06N 20/00 |
| 10,599,506 | B2 | 3/2020 | Cohen et al. |
| 11,296,971 | B1 | 4/2022 | Jain et al. |
| 11,316,941 | B1 | 4/2022 | Jain et al. |
| 11,610,679 | B1 | 3/2023 | Zhan et al. |

(Continued)

FOREIGN PATENT DOCUMENTS

WO WO-2023064042 A1 * 4/2023 ........... G06F 21/577

OTHER PUBLICATIONS

Vennam, "What is Distributed Cloud?", https://www.ibm.com/blog/distributed-cloud/, Aug. 11, 2020; 4 Pages.

(Continued)

*Primary Examiner* — Philip C Lee
(74) *Attorney, Agent, or Firm* — Jared Chaney; CALDERON SAFRAN & WRIGHT P.C.; Andrew D. Wright

(57) ABSTRACT

Embodiments receive a data metrics input which corresponds with a microservice issue, determine a final outcome by multiplying each metric of the data metrics input by a weight, determine a link output based on the final outcome, determine a cost function based on the link output, evaluate that a cost output of the cost function has a minimized error, output a data metrics output based on the cost output of the cost function having the minimized error, train at least one machine learning (ML) model using the data metrics output, receive a new data metrics input which corresponds with another microservice issue, and provide a recommendation corresponding to the new data metrics input using the trained at least one ML model.

20 Claims, 7 Drawing Sheets

(56) References Cited

U.S. PATENT DOCUMENTS

| | | | |
|---|---|---|---|
| 11,632,435 | B1 | 4/2023 | Jain et al. |
| 11,736,580 | B1* | 8/2023 | Bhuyan .................. H04L 41/16 |
| 2019/0052551 | A1 | 2/2019 | Barczynski et al. |
| 2020/0285891 | A1* | 9/2020 | Yellin ..................... H04L 67/34 |
| 2020/0413263 | A1 | 12/2020 | Jiang |
| 2023/0134546 | A1* | 5/2023 | Gopalakrishnan ..... G06N 20/20 726/23 |
| 2025/0022459 | A1* | 1/2025 | Lai ........................ G10L 15/065 |
| 2025/0053501 | A1* | 2/2025 | Ayyadurai ............. G06N 20/00 |

OTHER PUBLICATIONS

IBM, "Red Hat OpenShift on IBM Cloud", https://www.ibm.com/products/openshift, Dec. 13, 2023; 9 Pages.

IBM, "IBM Cloud. Hybrid. Open. Resilient", https://www.ibm.com/cloud, May 17, 2023; 8 Pages.

McMahan et al., "Federated Learning: Collaborative Machine Learning without Centralized Training Data", https://blog.research.google/2017/04/federated-learning-collaborative.html, Apr. 6, 2017; 3 Pages.

Hochenbaum et al., "Automatic Anomaly Detection in the Cloud Via Statistical Learning", https://arxiv.org/pdf/1704.07706.pdf, Apr. 24, 2017; 13 Pages.

Krishnan, "Anomaly Detection with Time Series Forecasting", https://towardsdatascience.com/anomaly-detection-with-time-series-forecasting-c34c6d04b24a, Mar. 3, 2019; 17 Pages.

Anomaly, "Detecting Anomalies with Moving Median Decomposition", https://anomaly.io/anomaly-detection-moving-median-decomposition/, Jan. 12, 2016; 8 Pages.

Liu et al., "Client-Edge-Cloud Hierarchical Federated Learning", https://arxiv.org/abs/1905.06641, Oct. 31, 2019; 6 Pages.

Huang et al., "Personalized Cross-Silo Federated Learning on Non-IID Data", https://arxiv.org/abs/2007.03797, Dec. 14, 2021; 9 Pages.

Ludwig et al., "IBM Federated Learning—machine learning where the data is", https://web.archive.org/web/20201008015108/https://www.ibm.com/blogs/research/2020/08/ibm-federated-learning-machine-learning-where-the-data-is/, Aug. 21, 2020; 6 Pages.

Gamboa, "Deep Learning for Time-Series Analysis", https://arxiv.org/pdf/1701.01887.pdf, Jan. 7, 2017; 13 Pages.

Tadayon et al., "A clustering approach to time series forecasting using neural networks: A comparative study on distance-based vs. feature-based clustering methods", https://arxiv.org/pdf/2001.09547.pdf, Mar. 31, 2021; 9 Pages.

Staudemeyer et al., "Understanding LSTM—a tutorial into Long Short-Term Memory Recurrent Neural Networks", https://arxiv.org/abs/1909.09586, Sep. 12, 2019; 42 Pages.

Sherstinsky, "Fundamentals of Recurrent Neural Network (RNN) and Long Short-Term Memory (LSTM) Network", https://arxiv.org/abs/1808.03314, Mar. 2020; 43 Pages.

Oracle, "Alert Management User Guide", https://docs.oracle.com/cd/E91253_01/PDF/8.0.6.0.0/Alert%20Management%20User%20Guide_bd_8.0.6.pdf, Mar. 2017; 340 Pages.

Brankovic et al., "Explainable machine learning for real-time deterioration alert prediction to guide pre-emptive treatment", https://doi.org/10.1038/s41598-022-15877-1, Jul. 11, 2022; 10 Pages.

Thekkilakattil, "Limited Preemptive Scheduling in Real-Time Systems", https://www.diva-portal.org/smash/get/diva2:911669/FULLTEXT01.pdf, Mar. 14, 2016; 216 Pages.

Shimada et al., "Metric Learning With Background Noise Class for Few-Shot Detection of Rare Sound Events", https://doi.org/10.48550/arXiv.1910.13724, Feb. 18, 2020; 5 Pages.

Karteri et al., "Preemptive and Non Preemptive Priority Scheduling", http://www.ijcsms.com/abstractdetails.aspx?abs=853, Oct. 2015; 6 Pages.

Huang et al. "Personalized Federated Learning: An Attentive Collaboration Approach", Semanti Scholar, Jul. 2020.

IBM. "What's Next in Computing is Generative and quantum", retrieved from https://research.ibm.com/blog, May 9, 2025, 6 pages.

IBM. "IBM Products", retrieved from web https://www.ibm.com/products, dated Jun. 9, 2025, 15 pages.

* cited by examiner

ALERT MANAGEMENT

BACKGROUND

Aspects of the present invention relate generally to an alert management system.

With the advent of microservices in open source systems for containerization applications and serverless architectures, distributed systems follow certain protocols and applications according to functional requirements and business needs.

SUMMARY

In a first aspect of the invention, there is a computer-implemented method including: receiving, by a processor set, a data metrics input which corresponds with a microservice issue; determining, by the processor set, a final outcome by multiplying each metric of the data metrics input by a weight; determining, by the processor set, a link output based on the final outcome; determining, by the processor set, a cost function based on the link output; evaluating, by the processor set, that a cost output of the cost function has a minimized error; outputting, by the processor set, a data metrics output based on the cost output of the cost function having the minimized error; training, by the processor set, at least one machine learning (ML) model using the data metrics output; receiving a new data metrics input which corresponds with another microservice issue; and providing, by the processor set, a recommendation corresponding to the new data metrics input using the trained at least one ML model.

In another aspect of the invention, there is a computer program product including one or more computer readable storage media having program instructions collectively stored on the one or more computer readable storage media. The program instructions are executable to: receive a data metrics input which corresponds with a microservice issue; determine a final outcome by multiplying each metric of the data metrics input by a weight; determine a link output based on the final outcome; determine a cost function based on the link output; evaluate that a cost output of the cost function has a minimized error; output a data metrics output based on the cost output of the cost function having the minimized error; train at least one machine learning (ML) model using the data metrics output; receive a new data metrics input which corresponds with another microservice issue; and provide a recommendation corresponding to the new data metrics input based on the trained at least one ML model.

In another aspect of the invention, there is a system including a processor set, one or more computer readable storage media, and program instructions collectively stored on the one or more computer readable storage media. The program instructions are executable to receive a data metrics input which corresponds with a microservice issue; determine a final outcome by multiplying each metric of the data metrics input by a weight; determine a link output based on the final outcome; determine a cost function based on the link output; evaluate that a cost output of the cost function has a minimized error; output a data metrics output based on the cost output of the cost function having the minimized error; train at least one machine learning (ML) model using a logistical regression model and reinforcement learning based on the data metrics output; receive a new data metrics input which corresponds with another microservice issue; and provide a recommendation corresponding to the new data metrics input using the trained at least one ML model.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
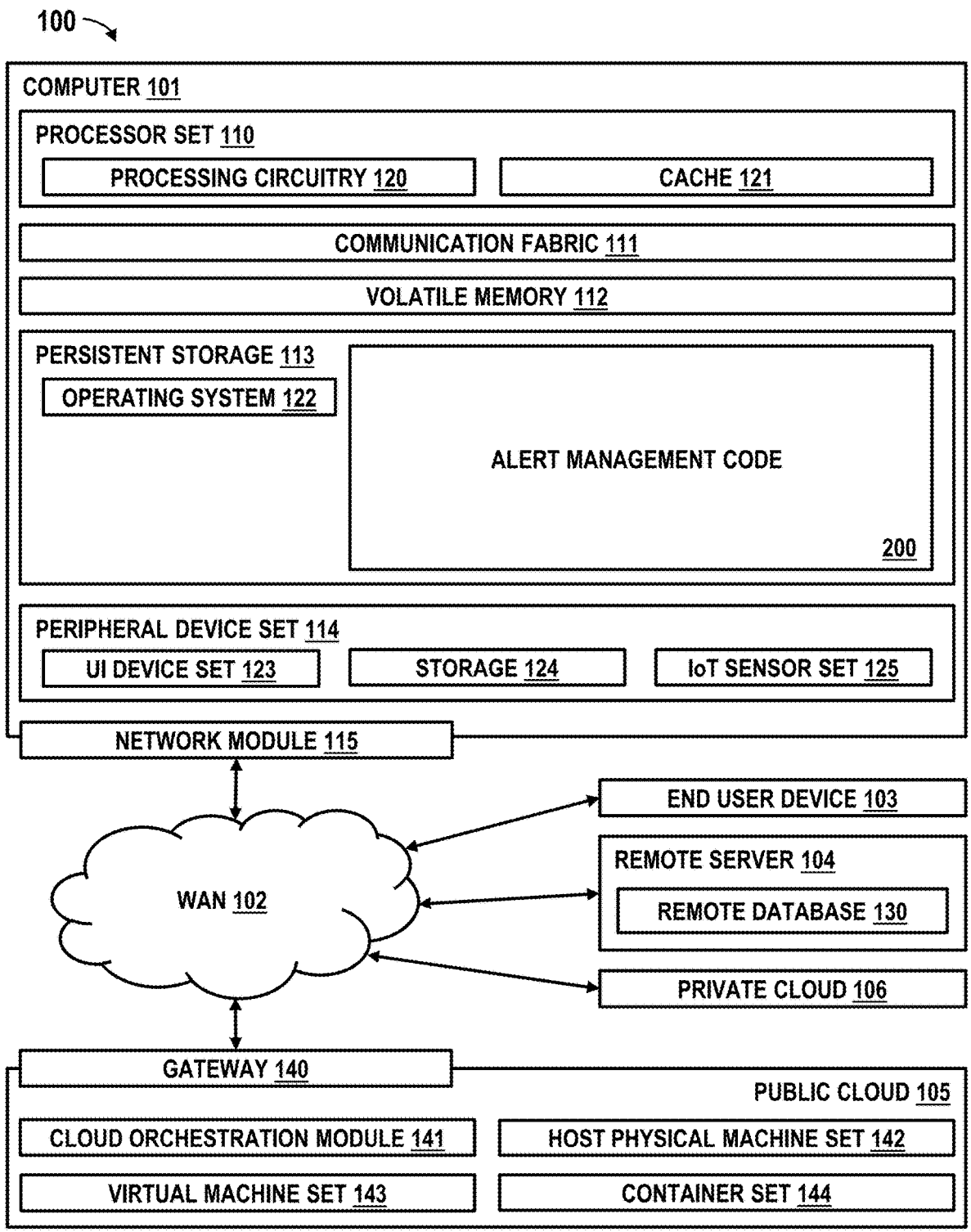
FIG. 1 depicts a computing environment according to an embodiment of the present invention.

Aspects of the present invention relate generally to an alert management system.

Embodiments of the present invention provide an improved mean time to repair (MTTR) in comparison to conventional systems. Aspects of the present invention provide a pre-emptive issue alert in order to take an ameliorative action and resolution of an issue that occurs when using microservices. Implementations of the present invention also provide advanced warning of future issues occurring with microservices. In this manner, embodiments of the present invention predict an intensity of an issue which is going to occur and trigger a pre-emptive alert. In accordance with aspects of the present invention, issue summarization and issue amelioration are provided for pre-emptive triggering.

Embodiments of the present invention also build and generate pre-trained models for past alerts, severity, and action recommendation/resolution. Aspects of the present invention provide integration of federated learning to leverage internet of things (IoT) and on-edge technology to alert current customers which face similar issues that have happened in other parts of a cloud environment and pre-emptively predict the issues occurring with the current customers. Aspects of the present invention also provide integration of reinforcement learning to curate actions with a human in the loop to generate custom models for an ongoing distributed system.

Aspects of the present invention provide an advanced warning whenever issues occur with microservices. Embodiments of the present invention also leverage federated learning on the edge of a cloud environment. Aspects of the present invention also amalgamate the leveraged federated learning with reinforcement learning with a human in the loop to curate and generate custom models.

Embodiments of the present invention provide a computer-implemented method, a system, and a computer program product for predicting issues with microservices and providing a pre-emptive alert based on the predicted issues.

In contrast, conventional systems merely detect issues that occur in microservices such as deadlocks in microservices working on the same resources, deadlocks in the microservices waiting for the same services, a longer time for consistency, a memory leak when memory is out, services which consume too many resources, and chatty applications which consume too much network bandwidth. Further, conventional systems merely focus on providing alerts when these issues occur with microservices. However, conventional systems are not able to pre-emptively provide an alert before an issue occurs in microservices. Further, embodiments of the present invention predict an intensity of an issue in order to take an appropriate action to resolve the issue before the issue degrades reliability of the microservices. Embodiments of the present invention also utilize machine learning (ML) algorithms such as federated learning and reinforcement learning to train a plurality models for predicting future issues with microservices and corresponding intensities of the issues.

Embodiments of the present invention include a highly computationally efficient system, method, and computer program product for providing a pre-emptive alert. Accordingly, implementations of the present invention provide an improvement (i.e., technical solution) to a problem arising in the technical field of providing alerts related to issues which occur when using microservices. In particular, embodiments of the present invention predict issues related to microservices and pre-emptively provide an alert in order to take an action which resolves the issues before an intensity of the issues renders the microservices inoperable. Embodiments of the present invention also use ML to train a plurality of models which provide real-time predictive alerts of future issues with microservices which may critically degrade and cripple reliability of the microservices.

Implementations of the present invention are necessarily rooted in computer technology. For example, the step of training, by the processor set, at least one machine learning (ML) model based on the data metrics output is computer-based and cannot be performed in the human mind. Training and building at least one ML model is, by definition, performed by a computer and cannot practically be performed in the human mind (or with pen and paper) due to the complexity and massive amounts of calculations involved. For example, training and building the at least one ML model in embodiments of the present invention may use machine learning to build and train the at least one ML model using historical data of previous issues that occur when using microservices to improve the predictive accuracy of future issues, the intensities of the issues, and solutions which resolve the issues before the microservices are rendered inoperable. In particular, training and building the at least one ML model uses a large amount of processing of historical data of previous issues and modeling of parameters to train the at least one ML model such that the at least one ML model generates and outputs in real time (or near real time). Given the scale and complexity of processing historical data of previous issues that occur when using microservices and modeling of parameters, it is simply not possible for the human mind, or for a person using pen and paper, to perform the number of calculations involved in training and/or building the at least one ML model.

Aspects of the present invention include a method, system, and computer program product for providing pre-emptive issue alerts. For example, a computer-implemented method includes: detecting, by a system, an event related to a microservice; measuring a metric associated with the event; learning, by the system, from pairs of events of at least one final outcome; updating a machine learning model based on the at least one final outcome; recording past actions taken based on the event, training the model based on the past actions taken; updating the model based on past recommendations using federated learning; and generating a proactive action using the machine learning model based on a detection of similarities to past events.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as alert management code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
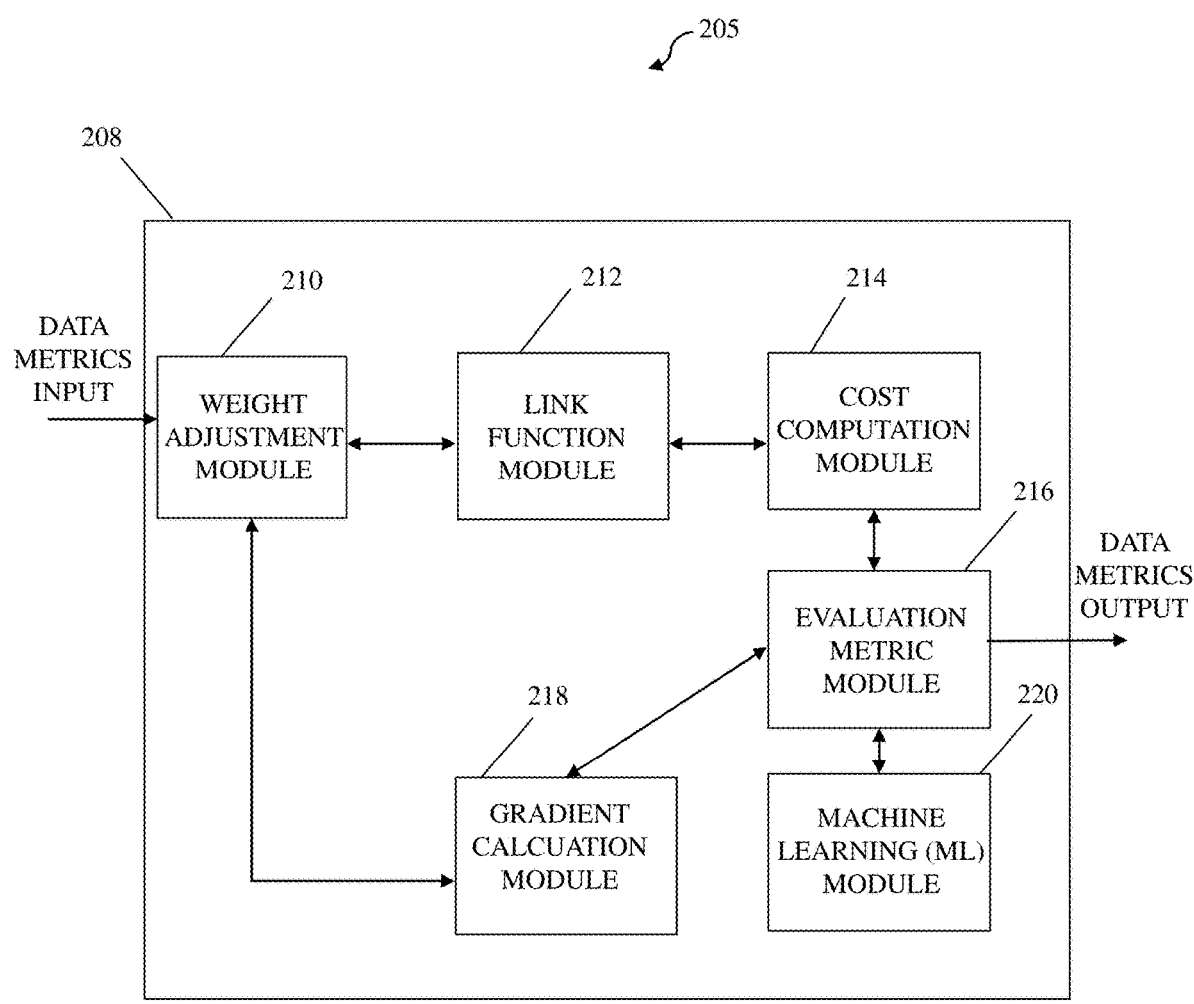
FIG. 2 shows a block diagram of an exemplary environment in accordance with aspects of the present invention.

FIG. 2 shows a block diagram of an exemplary environment 205 in accordance with aspects of the present invention. In embodiments, the environment 205 includes an alert management server 208, which may comprise one or more instances of the computer 101 of FIG. 1. In other examples, the alert management server 208 comprises one or more virtual machines or one or more containers running on one or more instances of the computer 101 of FIG. 1.

In embodiments, the alert management server 208 of FIG. 2 comprises a weight adjustment module 210, a link function module 212, a cost computation module 214, an evaluation metric module 216, a gradient calculation module 218, and a machine learning (ML) module 220, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The alert management server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, the weight adjustment module 210 receives a data metrics input corresponding to a microservices issue from an external system. In embodiments, the data metrics input comprises any feature of resources in a cloud computing system which supports execution of an application. For example, the data metrics input may include at least one of a central processing unit (CPU) utilization, memory utilization, disk utilization, server response time, pages served per time period, delta in a storage space or hard drive disk network traffic of services, consistency score extracted from a series of tests, resource consumption metrics for all the microservices, all other infrastructure metrics which are involved in an analysis of issues found in data sources considered as feature vectors. In some embodiments, the consistency score extracted from the series of tests comprises scheduling tests for all data store instances and then performing data verification and vector clocking based tracking to check whether the data store instances have a same state or a different state after completion of the tests. In other embodiments, the infrastructure metrics comprise at least one of Kibana® logs, Grafana® logs, other data source metrics, etc.

In reference to FIG. 2, the weight adjustment module 210 receives the data metrics input and then multiplies each metric of the data metrics by corresponding weights (e.g., initial weights) as specified in Equation 1 below:

$$a = w_0 + w_1 * x_1 + w_2 * x_2 + \ldots w_n * x_n \quad \text{(Equation 1)}.$$

In the Equation 1 above, $x_1, x_2, \ldots, x_n$ are different metrics of the data metrics input and $w_0, w_1, w_2, \ldots w_n$ are different weights for each metric, and a is a final outcome (e.g., whether an alert was generated, what was a type of the alert, what was a severity of the alert, or what was a remedial action taken for the alert). The weight adjustment module 210 uses initial random weights for each metric when first receiving the data metrics input and receives updated weights from the gradient calculation module 218 if an error is not minimized from an output of a cost function. Further, the weight adjustment module 210 also records and stores a data pair of an event within the microservices and at least one metric corresponding to the event in a datastore.

In an example of FIG. 2, using Equation 1, the weight adjustment module 210 determines whether an alert was generated (e.g., final outcome a)=initial weight (e.g., $w_0$)+ first weight (e.g., $w_1$)*first metric for potential alert (e.g., $x_1$)+second weight (e.g., $w_2$)*second metric for the potential alert ($x_2$), . . . , last initial weight (e.g., $w_n$)*last metric for the potential alert (e.g., $x_n$). Thus, the weight adjustment module 210 maps the determination of whether the alert was generated against the weighted metrics of the potential alert. In other scenarios, the weight adjustment module 210 maps the determination of what the type of the alert is against the weighted metrics of the type of the alert, maps the determination of the severity of the alert against the weighted metrics of the severity of the alert, and maps the determination of the remedial action taken for the alert against the weighted metrics of the remedial action. The weight adjustment module 210 then sends the final outcome to the link function module 212.

Still referring to FIG. 2, the link function module 212 receives the final outcome a and then uses a link function as specified in Equation 2:

$$\hat{y}_i = 1/(1+e^{-a}) \quad \text{(Equation 2)}.$$

In the Equation 2 above, $\hat{y}_i$ is the link output, e is an exponential function, and a is the final outcome. The link function module 212 calculates the $\hat{y}_i$ link output based on the final outcome a. The link function module 212 sends the $\hat{y}_i$ link output to the cost computation module 214.

In accordance with aspects of the present invention, the cost computation module 214 receives the $\hat{y}_i$ link output and then calculates a cost function as specified in Equation 3:

$$\text{cost}(w) = \left(-\frac{1}{m}\right)\sum_{i}^{i=m} y_i * \log(\hat{y}_i) + (1 - y_i) * \log(1 - \hat{y}_i). \quad \text{(Equation 3)}$$

In the Equation 3 above, cost(w) is an output of the cost function, $\hat{y}_i$ is the link output, i is an integer that goes from 1 to m, m is a final integer value, and $y_i$ is a class that is either "1" or "0". The cost computation module 214 calculates the cost(w) output and then sends the cost(w) output to the evaluation metric module 216.

Still referring to FIG. 2, the evaluation metric module 216 evaluates whether the cost(w) output of the cost function has a minimized error. The evaluation metric module 216 outputs a data metrics output in response to determining that the cost(w) output of the cost function has a minimized error. Further, the evaluation metric module 216 outputs the data metrics output to the machine learning (ML) module 220 for training at least one machine learning (ML) model in response to determining that the cost(w) output of the cost function has the minimized error. In further embodiments, the data metrics output with the minimized error is used to train a logistical regression model of the at least one ML model. However, embodiments are not limited to this example, such that the data metrics output with the minimized error is used to train another type of the at least one ML model, e.g., a deep learning neural network model. In further aspects of the present invention, the machine learning (ML) module 220 receives a new data metrics input which corresponds with another microservices issue from the external system. Then, the machine learning (ML) module 220 provides a recommendation corresponding to the new data metrics input based on the at least one trained ML model. In embodiments and as described with FIG. 2, the ML module 220 provides the recommendation for remedying the microservices issue corresponding to the new data metrics input to the evaluation metric module 216. Further, in embodiments, the evaluation metric module 216 outputs a non-minimized error to the gradient calculation module 218 in response to determining the cost(w) output of the cost function does not have the minimized error.

In embodiments of FIG. 2, the gradient calculation module 218 receives the non-minimized error and calculates an updated weights $w_0, w_1, w_2, \ldots w_n$ for each metric. The gradient calculation module 218 sends the updated weights $w_0, w_1, w_2, \ldots w_n$ for each metric to the weight adjustment module 210 and the process is repeated until the evaluation metric module 216 evaluates that the cost(w) output of the cost function has the minimized error. In this situation, as described above, the evaluation metric module 216 outputs the data metrics output to the machine learning (ML) module 220 for training the at least one ML model.

In accordance with aspects of the present invention, a final equation which is a combination of Equations 1, 2, and 3 is specified below as Equation 4:

$$p(y \mid X; W) = \sum_{i=1}^{i=n}(h_W(X))^y + \left(1 - (h_w(X))^{1-y}\right)$$

(Equation 4).

In the Equation 4 above, $h_w(X)$ is equal to the $\hat{y}_i$ link output, y is an integer value that is either "1" or "0", and p(y|X; W) is the cost(w) output of the cost function. Thus, the evaluation metric module outputs the data metrics output in response to determining that the cost(w) output of the cost function has a minimized error. Further, the evaluation metric module 216 outputs a non-minimized error to the gradient calculation module 218 in response to determining the cost(w) output of the cost function does not have the minimized error.

Figure 5:
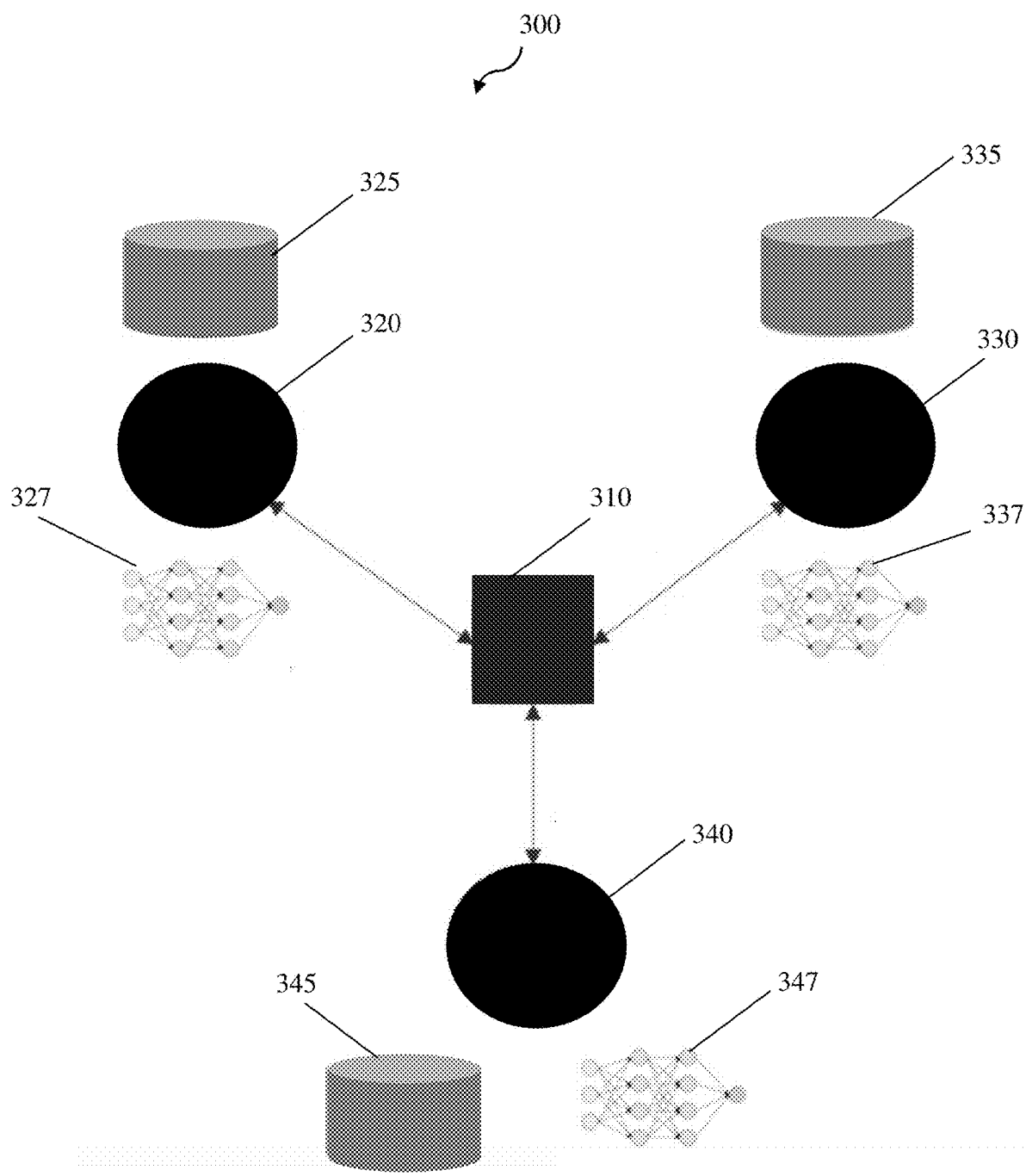
FIG. 5 shows a block diagram of a federated learning environment in accordance with aspects of the present invention.
Figure 6:
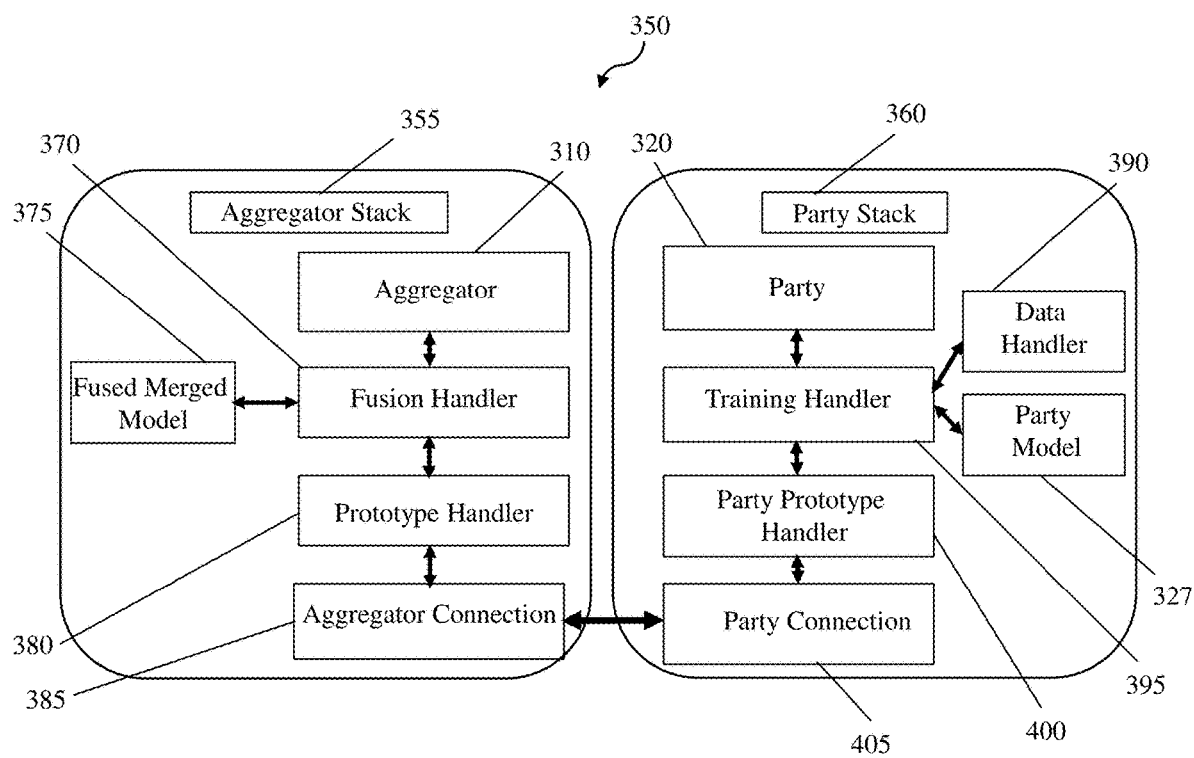
FIG. 6 shows a block diagram of an aggregator stack and a party stack in accordance with aspects of the present invention.

In accordance with further aspects of the present invention, the evaluation metric module 216 outputs the data metrics output to the ML module 220 to train the ML model (e.g., logistical regression model or the deep learning neural network model) using federated learning. In embodiments, the ML module 220 uses federated learning to collaborate and share the data metrics output across distributed systems. In further embodiments, ML module 220 communicates with an aggregator and a plurality of parties collaborate to train the ML model (i.e., one of the logistical regression model and the deep learning neural network model). In embodiments, each party includes private data that is used to locally train a party model for a cloud instance or an edge device. In further embodiments, the aggregator queries each party for their local results and then each party will respond to the aggregator with their model parameter results (e.g., a vector of model weights in the deep learning neural network model). The aggregator then fuses the model parameter results from each party into a merged model. For example, in the case of the deep learning neural network model, the aggregator averages the vector of model weights into the merged model. The aggregator then distributes the fused model to the parties for the next round of training. Details of the aggregator and the parties are shown in FIGS. 5 and 6.

In further aspects of the present invention, the evaluation metric module 216 outputs the data metrics output to the ML module 220 to provide summarization and proactive action generation. In particular, the ML module 220 creates and stores word embeddings with a specific time (e.g., T1) based on text of the data metrics output. In addition, the ML module 220 uses linear discriminant analysis (LDA) for topic modeling in order to extract a baseline topic for the word embeddings. Then, the ML module 220 calculates weights associated with the word embeddings using a similarity matrix. In further embodiments, the ML module 220 uses cosine similarity to identify and extract similar word vectors from the created word embeddings, the weights associated with the word embeddings, and the extracted baseline topic. In further embodiments, cosine similarity is used to identify and extract similar word vectors based on the created word embeddings, the weights associated with the word embeddings, and the extracted baseline topic using pattern matching. Finally, in embodiments, the ML module 220 takes an assistive action using a long-short term memory (LSTM) model which keeps track of the pattern matching history of previous word embeddings, the previous weights associated with the word embeddings, and the previous extracted baseline topics.

Figure 7:
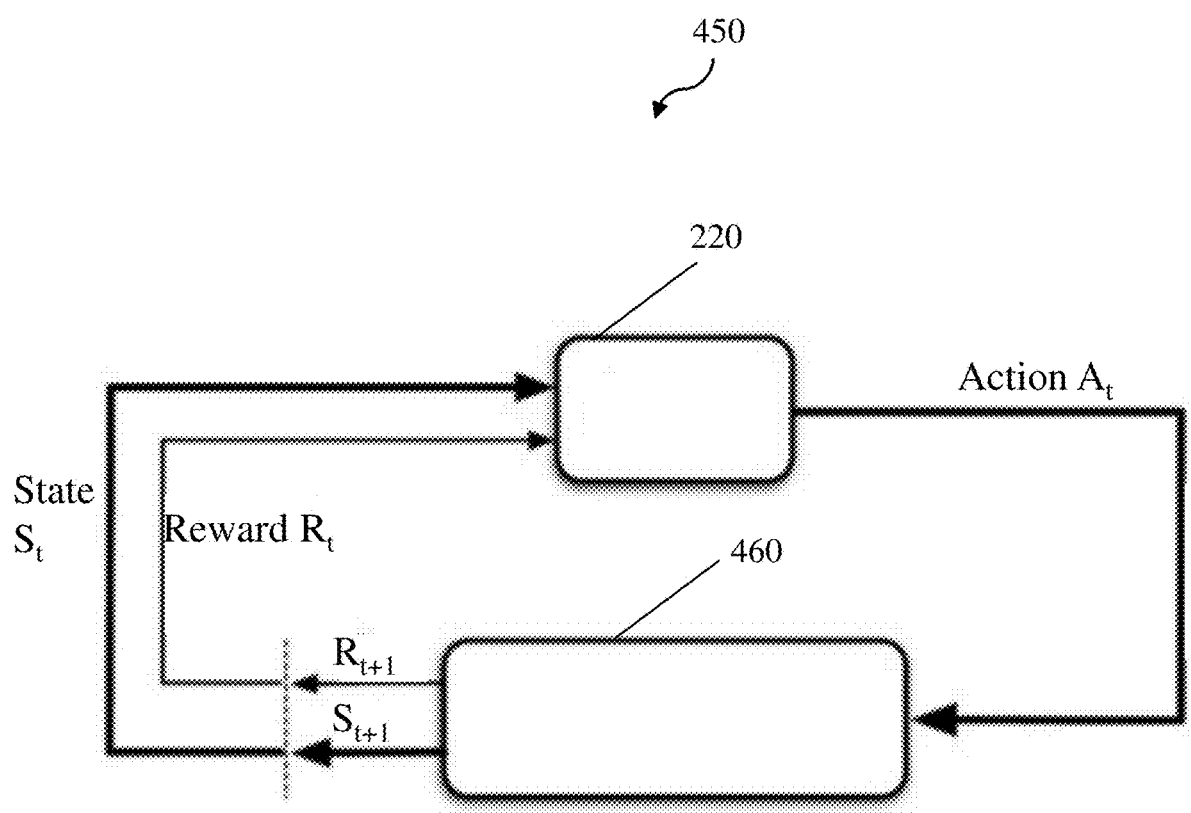
FIG. 7 shows a block diagram of reinforcement learning environment in accordance with aspects of the present invention.

In other aspects of the present invention, the evaluation metric module 216 outputs the data metrics output to the ML module 220 to improve the ML model (e.g., logistical regression model or the deep learning neural network model) using reinforcement learning. In particular, the ML module 220 improves the ML model based on a type of recommendation (e.g., an action and/or remedy to an issue with a microservice) made in the past for a previous event and corresponding data metrics. In particular, the ML model provides the action and/or the remedy based on the data metrics output to resolve the issue with the microservice. In embodiments, the ML module 220 receives feedback through positive or negative reinforcement of the action and/or remedy to update the ML model. In embodiments, the positive or negative reinforcement is provided by a user (e.g., a software architect). In other embodiments, the positive or negative reinforcement is automatically provided by another artificial intelligence (AI) reinforcement model which compares the action and/or the remedy to actions and/or remedies made in the past for a previous event and corresponding data metrics. In either scenario, the positive or negative reinforcement trains and fine-tunes the ML model to improve an accuracy of future recommendations (i.e., future actions and/or remedies to a future issue with the microservice). Details of the reinforcement learning are shown in FIG. 7.

Figure 3:
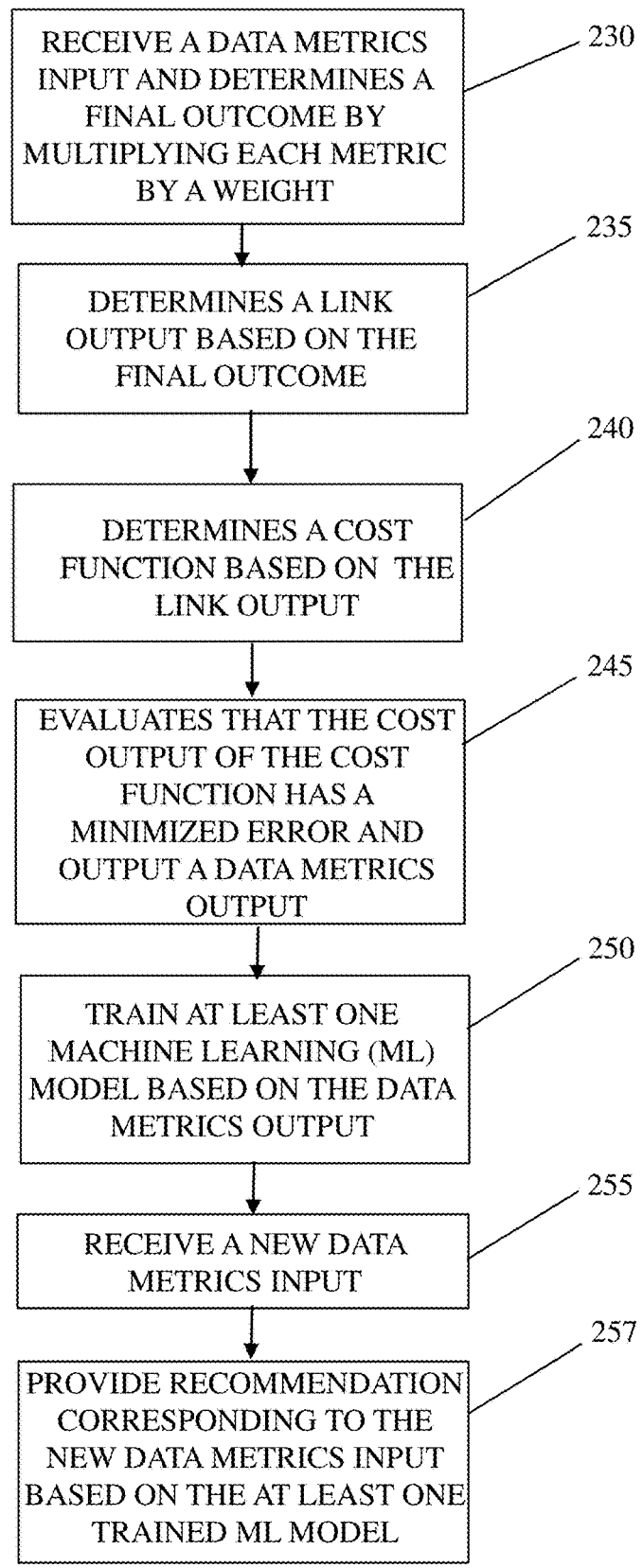
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At step 230, the system receives, at the weight adjustment module 210, a data metrics input corresponding to a microservices issue from an external system. In embodiments and as described with FIG. 2, the weight adjustment module 210 determines a final outcome (e.g., one of whether an alert was generated, what the type of the alert is, the severity of the alert, and a remedial action taken for the alert) by multiplying each of the metrics by a corresponding weight.

At step 235, the system determines, at the link function module 212, a link output based on the final outcome. In embodiments and as described with FIG. 2, the link function module 212 determines the link output based on an exponential function.

At step 240, the system determines, at the cost computation module 214, a cost function based on the link output. In embodiments and as described with FIG. 2, the cost computation module 214 determines the cost function based on a log function.

At step 245, the system evaluates, at the evaluation metric module 216, that the cost output of the cost function has a minimized error. In embodiments and as described with FIG. 2, the evaluation metric module 216 outputs a data metrics output in response to determining that the cost output of the cost function has the minimized error.

At step 250, the system trains at the machine learning (ML) module 220, at least one machine learning (ML) model based on the data metrics output. In embodiments and as described with FIG. 2, the at least one ML model comprises at least one of a logistical regression model and a deep learning neural network model.

At step 255, the system receives, at the machine learning (ML) module 220, a new data metrics input. In embodiments and as described with FIG. 2, the ML module 220 receives the new data metrics input which corresponds with another microservices issue from the external system At step 257, the system provides, at the machine learning (ML) module 220, a recommendation corresponding to the new data metrics input based on the at least one trained ML model. In embodiments and as described with FIG. 2, the ML module 220 provides the recommendation for remedying the microservices issue corresponding to the new data metrics input.

Figure 4:
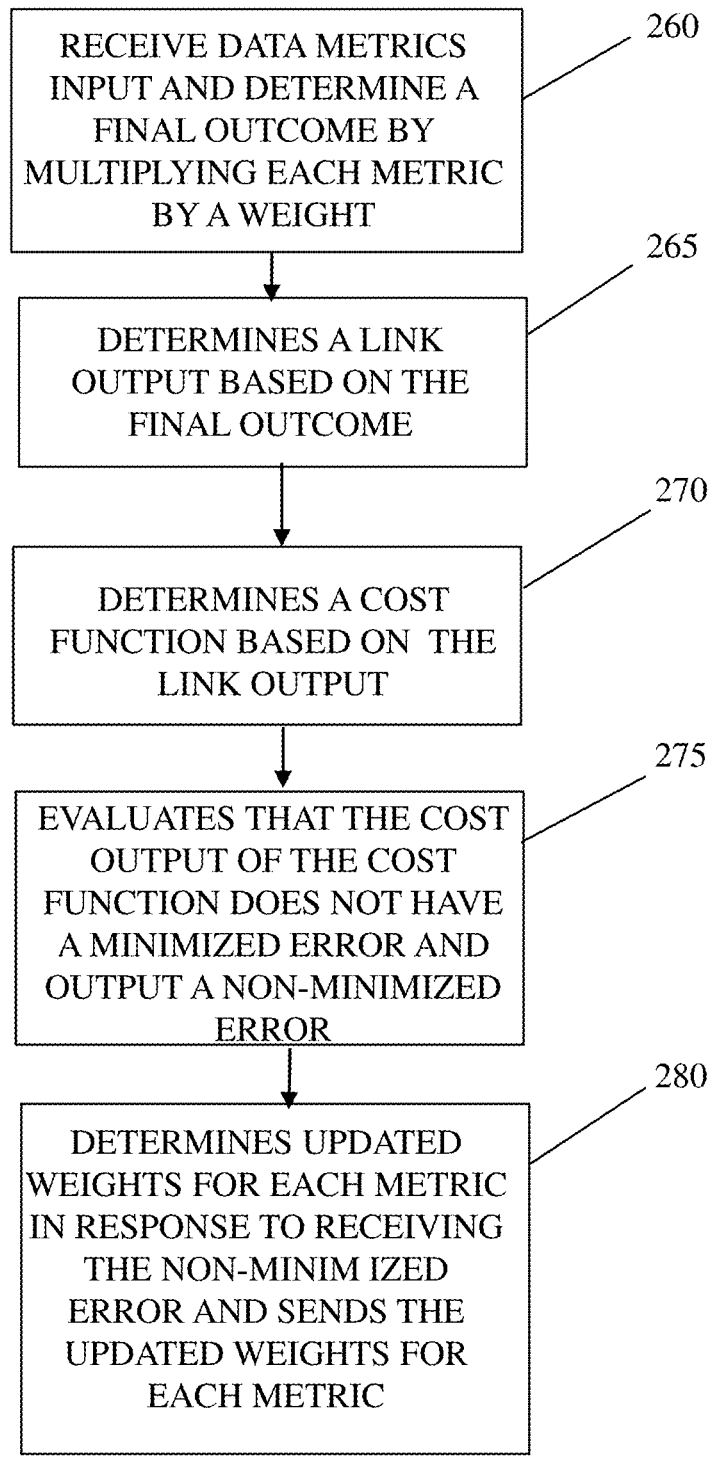
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

At step 260, the system receives, at the weight adjustment module 210, a data metrics input corresponding to a microservices issue from an external system. In embodiments and as described with FIG. 2, the weight adjustment module 210 determines a final outcome (e.g., one of whether an alert was generated, what the type of the alert is, the severity of the alert, and a remedial action taken for the alert) by multiplying each of the metrics by a corresponding weight.

At step 265, the system determines, at the link function module 212, a link output based on the final outcome. In embodiments and as described with FIG. 2, the link function module 212 determines the link output based on an exponential function.

At step 270, the system determines, at the cost computation module 214, a cost function based on the link output. In embodiments and as described with FIG. 2, cost computation module 214 determines the cost function based on a log function.

At step 275, the system evaluates, at the evaluation metric module 216, that the cost output of the cost function does not have a minimized error. In embodiments and as described with FIG. 2, the evaluation metric module 216 outputs a non-minimized error in response to determining that the cost output of the cost function does not have the minimized error.

At step 280, the system determines, at the gradient calculation module 218, updated weights in response to receiving the non-minimized error. In embodiments and as described with FIG. 2, the gradient calculation module 218 sends the updated weights to the weight adjustment module 210.

FIG. 5 shows a block diagram of a federated learning environment in accordance with aspects of the present invention. In embodiments, the ML module 220 uses a federated learning environment 300 to collaborate and share the data metrics output across distributed systems. In further embodiments, ML module 220 communicates with an aggregator 310 and a plurality of parties 320, 330, and 340 to collaborate to train the ML model (i.e., one of the logistical regression model or deep learning neural network model). In embodiments, the parties 320, 330, and 340 include corresponding private data 325, 335, and 345, respectively, that is used to locally train the corresponding party models 327, 337, and 347 for a cloud instance or an edge device. In further embodiments, the aggregator 310 queries the parties 320, 330, and 340 for their local results and then the parties 320, 330, and 340 will respond to the aggregator 310 with their model parameter results (e.g., a vector of model weights in the deep learning neural network model). The aggregator 310 then fuses the model parameter results from the parties 320, 330, and 340 into a merged model. For example, in the case of the deep learning neural network model, the aggregator 310 averages the vector of model weights into the merged model. The aggregator then distributes the fused merged model to the parties 320, 330, and 340 for the next round of training. In an example, the ML model is trained using the fused merged model which incorporates the corresponding private data 325, 335, and 345 of each of the parties 320, 330, and 340 to improve accuracy and predictive recommendations in comparison to merely training the ML model using data from a closed-loop system (i.e., not a distributed system).

FIG. 6 shows a block diagram of an aggregator stack and a party stack in accordance with aspects of the present invention. In embodiments of FIG. 6, the aggregator and party environment 350 includes an aggregator stack 355 which includes the aggregator 310 of FIG. 5, a fusion handler 370, a fused merged model 375, a prototype handler 380, and an aggregator connection 385. In further embodiments of FIG. 6, the party stack 360 includes the party 320 of FIG. 5, the data handler 390, the party model 327 of FIG. 5, the training handler 395, the party prototype handler 400, and a party connection 405.

Still referring to FIG. 6, the aggregator stack 355 communicates with the party stack 360 through the aggregator connection 385 and the party connection 405, respectively. In particular, the aggregator stack 355 fuses the model parameters from the party 320 into the fused merged model 375. The aggregator stack 355 then distributes the fused merged model to the party 320 through the party connection 405 for the next round of training. In an example, the party 320 receives the fused merged model and incorporates the fused merged model into the party model 327 for local training (i.e., at a level of the party 320). Accordingly, the party model 327 is now trained with aggregated data that has been aggregated from different parties and local data of the party 320, Thus, as the party model 327 is trained with additional data, the party model 327 is more robust and provides improved accuracy and predictive recommendations in comparison to merely using local data of the party 320.

FIG. 7 shows a block diagram of reinforcement learning environment in accordance with aspects of the present invention. In the reinforcement learning environment 450, the ML module 220 improves the ML model based on a type of recommendation (e.g., the action $A_t$ to provide a resolve an issue with a microservice) made in the past for a previous event and corresponding data metrics. In particular, the ML model of the ML module 220 provides the action At based on the data metrics output to resolve the issue with the microservice. In embodiments, the ML module 220 receives feedback through positive or negative reinforcement (i.e., reward $R_{t+1}$ and state $S_{t+1}$) of the action $A_t$ to update the state $S_t$ and the reward $R_t$ of the ML model in the ML module 220. In embodiments, the positive or negative reinforcement is provided by a user (e.g., a software architect 460). In other embodiments, the positive or negative reinforcement is automatically provided by another artificial intelligence (AI) reinforcement model which compares the action $A_t$ made in the past for a previous event and corresponding data metrics. In either scenario, the positive or negative reinforcement trains and fine-tunes the ML model of the ML module 220 to improve an accuracy of future recommendations (i.e., future actions and/or remedies to a future issue with the microservice).

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a processor set, a data metrics input which corresponds with a microservice issue;
   determining, by the processor set, a final outcome by multiplying each metric of the data metrics input by a weight;
   determining, by the processor set, a link output based on the final outcome;
   determining, by the processor set, a cost function based on the link output;
   evaluating, by the processor set, that a cost output of the cost function has a minimized error;
   outputting, by the processor set, a data metrics output based on the cost output of the cost function having the minimized error;
   training, by the processor set, at least one machine learning (ML) model using the data metrics output;
   receiving by the processor set, a new data metrics input which corresponds with another microservice issue; and
   providing, by the processor set, a recommendation corresponding to the new data metrics input using the trained at least one ML model.

2. The computer-implemented method of claim 1, wherein the final outcome corresponds to a binary value of whether an alert was generated for the microservice issue.

3. The computer-implemented method of claim 1, wherein the recommendation remedies the another microservice issue corresponding with the new data metrics input.

4. The computer-implemented method of claim 1, wherein the determining the final outcome further comprises multiplying each metric of the data metrics by a different random weight from remaining metrics of the data metrics input.

5. The computer-implemented method of claim 1, wherein the training the at least one ML model based on the data metrics output comprises using reinforcement learning to remedy the microservice issue.

6. The computer-implemented method of claim 1, wherein the training the at least one ML model based on the data metrics output comprises using federated learning to aggregate and average a vector of model weights from a plurality of parties into a merged model.

7. The computer-implemented method of claim 1, wherein the training the at least one ML model comprises training a logistical regression model of the at least one ML model based on the data metrics output with the minimized error.

8. The computer-implemented method of claim 1, wherein the training the at least one ML model comprises training a deep learning neural network model of the at least one ML model based on the data metrics output with the minimized error.

9. The computer-implemented method of claim 1, wherein the at least one ML model creates and stores word embeddings with a specific time based on text of the data metrics output.

10. The computer-implemented method of claim 9, wherein the at least one ML model uses linear discriminant analysis (LDA) for topic modeling in order to extract a baseline topic for the word embeddings.

11. The computer-implemented method of claim 10, wherein the at least one ML model calculates weights associated with the word embeddings using a similarity matrix.

12. The computer-implemented method of claim 11, wherein the at least one ML model uses cosine similarity to identify and extract similar word vectors from the created word embeddings using pattern matching.

13. The computer-implemented method of claim 12, wherein the at least one ML model takes an assistive action using a long-short term memory (LSTM) model which keeps track of a pattern matching history of previous word embeddings.

14. A computer program product comprising one or more computer readable storage media having program instructions collectively stored on the one or more computer readable storage media, the program instructions executable to:
   receive a data metrics input which corresponds with a microservice issue;
   determine a final outcome by multiplying each metric of the data metrics input by a weight;
   determine a link output based on the final outcome;
   determine a cost function based on the link output;
   evaluate that a cost output of the cost function has a minimized error;
   output a data metrics output based on the cost output of the cost function having the minimized error;
   train at least one machine learning (ML) model using the data metrics output;
   receive a new data metrics input which corresponds with another microservice issue; and
   provide a recommendation corresponding to the new data metrics input using the trained at least one ML model.

15. The computer program product of claim 14, wherein the training the at least one ML model based on the data metrics output comprises using reinforcement learning to remedy the microservice issue.

16. The computer program product of claim 14, wherein the training the at least one ML model based on the data metrics output comprises using federated learning to aggregate and average a vector of model weights from a plurality of parties into a merged model.

17. The computer program product of claim 14, wherein the training the at least one ML model comprises training a logistical regression model of the at least one ML model based on the data metrics output with the minimized error.

18. The computer program product of claim 14, wherein the training the at least one ML model comprises training a deep learning neural network model of the at least one ML model based on the data metrics output with the minimized error.

19. The computer program product of claim 14, wherein the recommendation remedies the another microservice issue corresponding with the new data metrics input.

20. A system comprising:
- a processor set, one or more computer readable storage media, and program instructions collectively stored on the one or more computer readable storage media, the program instructions executable to:
- receive a data metrics input which corresponds with a microservice issue;
- determine a final outcome by multiplying each metric of the data metrics input by a weight;
- determine a link output based on the final outcome;
- determine a cost function based on the link output;
- evaluate that the cost output of the cost function has a minimized error;
- output a data metrics output based on the cost output of the cost function having the minimized error;
- train at least one machine learning (ML) model using a logistical regression model and reinforcement learning based on the data metrics output;
- receive a new data metrics input which corresponds with another microservice issue; and
- provide a recommendation corresponding to the new data metrics input using the trained at least one ML model.

* * * * *